Nov. 8, 1938.   A. L. STAHL   2,135,857
TRAILER
Filed May 24, 1937   3 Sheets-Sheet 1

INVENTOR
A. L. Stahl
BY
ATTORNEY

Nov. 8, 1938.  A. L. STAHL  2,135,857
TRAILER
Filed May 24, 1937  3 Sheets-Sheet 2

INVENTOR
A. L. Stahl
BY
ATTORNEY

Nov. 8, 1938.    A. L. STAHL    2,135,857
TRAILER
Filed May 24, 1937    3 Sheets-Sheet 3

INVENTOR
A. L. Stahl
BY
ATTORNEY

Patented Nov. 8, 1938

2,135,857

UNITED STATES PATENT OFFICE 2,135,857

TRAILER

Albert L. Stahl, Turlock, Calif., assignor of one-half to James L. Collins, Turlock, Calif.

Application May 24, 1937, Serial No. 144,448

12 Claims. (Cl. 214—85)

This invention relates generally to the construction of a trailer for towing behind a motor vehicle and in particular relates to a two-wheeled general utility trailer especially designed for use by garage operators or the like.

The principal object of my invention is to provide a general utility trailer which may be selectively employed for the purpose of carrying an automobile thereon for transportation from one place to another; or used for raising an automobile for repair from beneath or the repair of wheels; or used as a combination trailer and derrick unit for raising one end of a disabled motor vehicle for towing the vehicle; or used as an open body trailer for general hauling.

A further object of my invention is to provide a winch unit removably mounted on the trailer for use to draw an automobile onto the trailer, or for use in connection with the derrick mechanism selectively.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
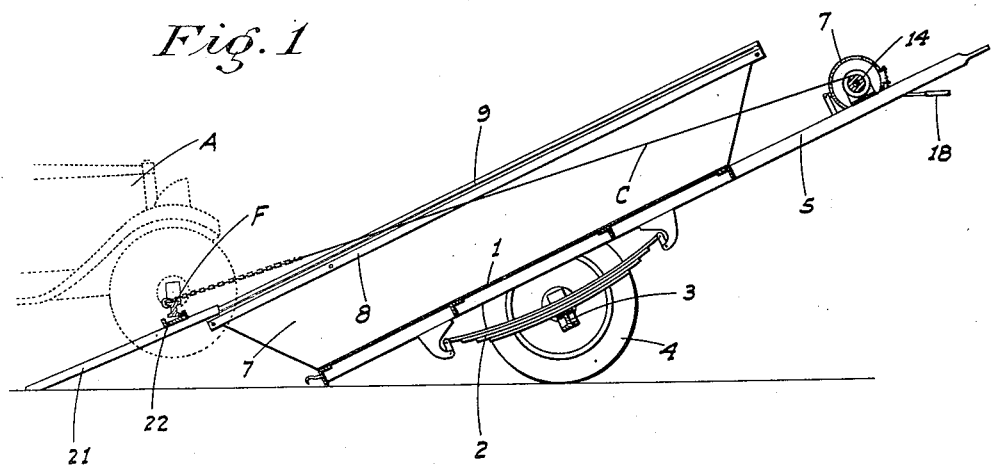
Figure 1 is a side elevation of the trailer in loading position and illustrating the manner in which an automobile is drawn onto the supporting rails.

Referring now more particularly to the characters of reference on the drawings, the trailer comprises a flat frame supported bed 1 mounted on springs 2 fixed on a transverse axle 3 having dual tired wheels 4 disposed on the axle spindles. A rigid draft tongue 5 projects forwardly from one end of the trailer bed and is suitably braced as at 6. Solid sides 7 are rigidly mounted on and extend upward from the side edges of the flat trailer bed 1 and are beveled at each end, the upper edges of the sides being materially longer than the lower edges which are substantially the length of the bed. The depth of the sides 7 is materially greater than the radius of an average sized automobile wheel for the purpose which will hereinafter appear. The upper edge of each side 7 is reinforced by means of a length of angle iron 8 disposed with one face in a horizontal position. A longitudinally extending section of rail 9 is mounted on the top of the horizontal portion of each angle iron 8.

Figure 6:
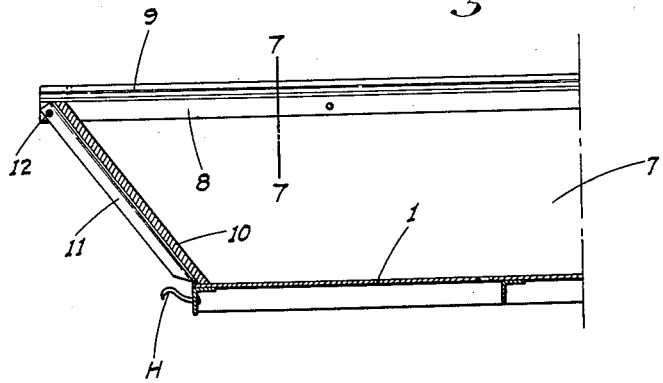
Figure 6 is an enlarged fragmentary sectional elevation of the trailer body illustrating particulary the mounting of the endgates.
Figure 7:
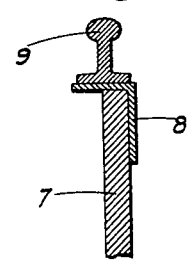
Figure 7 is a transverse section taken on line 7—7 of Fig. 6.
Figure 8:
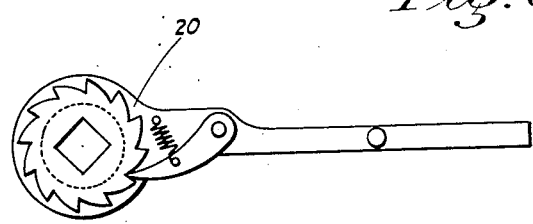
Figure 8 is a side view of the ratchet wrench used in connection with the winch.

Endgates 10 having side flanges 11 are removably connected at their upper ends to the outer ends of the reinforcing angle irons 8 by cross rods 12, the lower edge of each gate resting on the bed of the trailer as particularly shown in Fig. 6. When the endgates are thus in place, the trailer may be used as a general utility open-body carrying trailer.

A winch indicated generally at 13, is mounted on the tongue forwardly of the bed and with its axis disposed at right angles to said tongue. This winch comprises a cable drum 14 supported on a shaft 15, a releasable pawl and ratchet mechanism 16 being mounted in connection with the shaft to one side of the drum and normally acting to prevent unwinding of cable C therefrom. A friction brake device 17 including a manual control lever 18 is arranged in connection with one end of the shaft 15. The other end of the shaft is squared as at 19 to removably receive a ratchet wrench 20 provided with a handle adapted to receive an extension handle (not shown).

Figure 2:
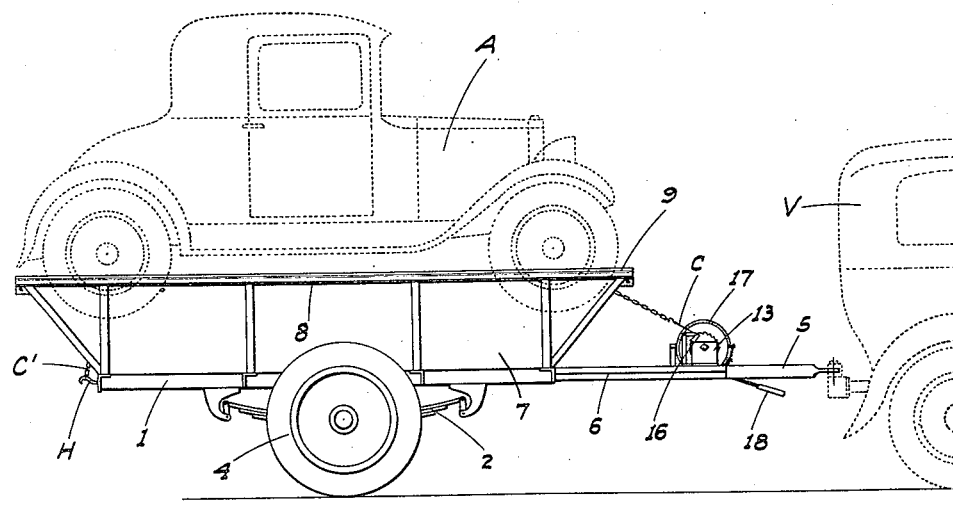
Figure 2 is a side elevation of the trailer as loaded and ready for transport.
Figure 3:
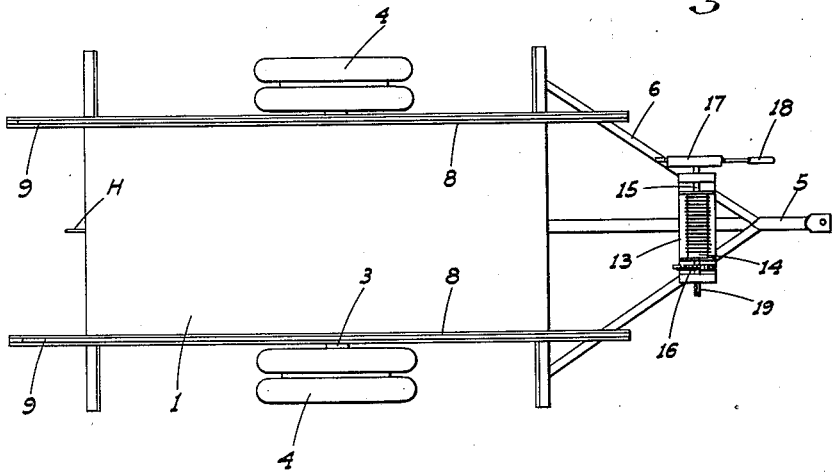
Figure 3 is a top plan of the trailer as used for carrying automobiles in the manner shown in Fig. 2.

When the device is used to carry an automobile thereon, the endgates 10 are removed and the trailer tilted rearwardly until the bed engages the ground. Spaced skids 21 are placed in position and extend from the ground to the rails 9 and in alinement therewith. A transversely extending channel iron 22 is then laid on the skids 21 and front axle F of the automobile A engaged in the channel iron. Cable C from the winch is then connected to the front axle of the automobile A and the winch actuated by means of wrench 20 which has been placed on the squared portion 19 of shaft 15. This draws the front axle of the automobile and the supporting channel iron onto rails 9. Another channel iron is then placed under the rear axle of the automobile and on the skids 21 and the winding of the cable on the winch drum continued until the automobile rests entirely on the rails and the trailer tips forward to a balanced position as shown in Fig. 2, the trailer being then connected to a draft vehicle V. The automobile A is maintained on the trailer in this position during transit by the cable C connected to the front axle and a chain C' extending from the rear axle to a hook H on the rear of the bed 1.

In the manner above described a wrecked automobile may be easily placed on the trailer and transported without difficulty. Also for repairs on the road, an automobile may be raised onto the rails and as the sides 7 are of relatively greater depth than the radius of the automobile wheels, a pit in effect is formed beneath the automobile. A mechanic can readily enter this pit beneath the automobile and make the necessary repairs on the under portions thereof. Wheel repair or replacement is likewise facilitated as the wheels depend outwardly of the sides and are readily accessible.

To remove the automobile from the trailer, the loading operation is merely reversed, the ratchet mechanism 16 being released and the friction brake device 17 used to prevent too rapid descent or rearward sliding movement of the automobile from the tilted trailer to the ground.

Figure 4:
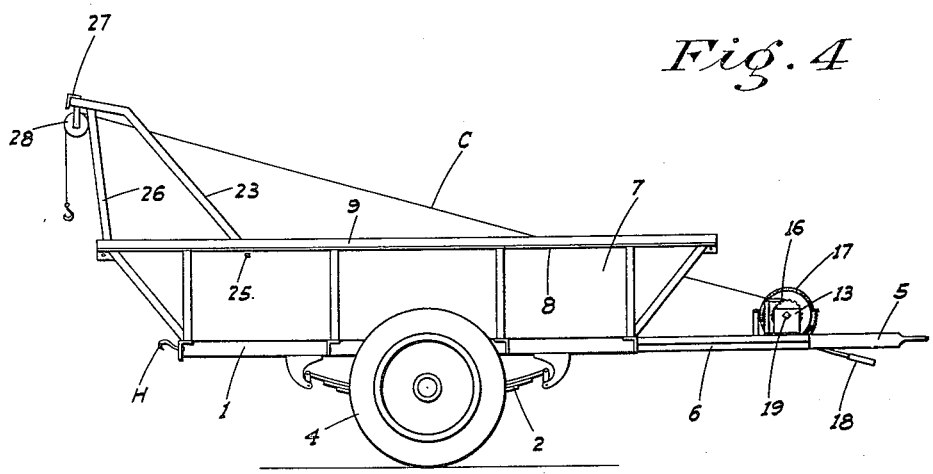
Figure 4 is a side elevation of the trailer equipped with the removable derrick unit.
Figure 5:
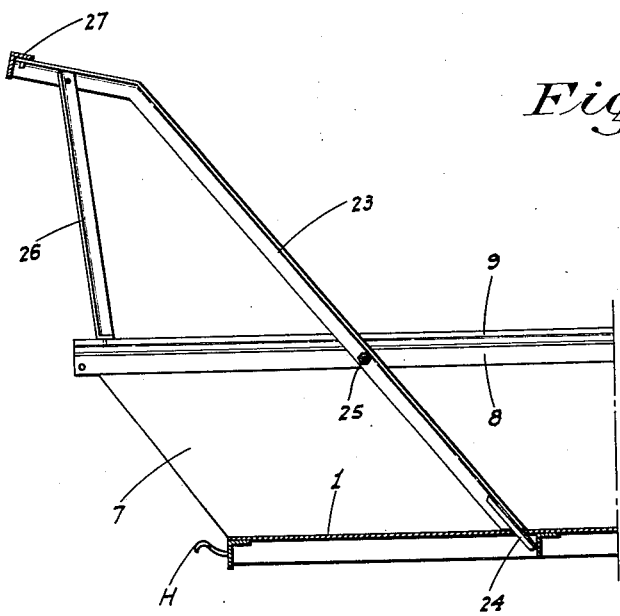
Figure 5 is an enlarged fragmentary sectional elevation illustrating the mounting of the derrick unit.

When it is desired to use the trailer to tow a disabled automobile with either the front or rear wheels of the automobile lifted clear of the road, the demountable derrick unit shown in Figs. 4 and 5 is used in conjunction with the winch and its cable C. The derrick unit comprises a pair of upwardly sloping rearwardly projecting beams 23 the lower ends of which are provided with pins 24 which removably project into openings in the bed adjacent but inwardly of the sides 7. Intermediate their ends the beams are connected by bolts 25 to the sides 7 adjacent their upper edges, said beams being bent toward horizontal adjacent their outer ends and terminating beyond the plane of the rear of the trailer bed. Supporting arms 26 extend from removable connection with the sides 7 to the beams adjacent their upper ends and a horizontal cross member 27 is removably mounted between the upper ends of said beams. A sheave 28 is supported from the cross member centrally between its ends, the sheave having the cable C from winch 13 threaded therethrough. When thus assembled the demountable derrick unit is used in the same manner as fixed derrick units now used in connection with wrecking trucks and the like. When not in use, the derrick unit is disassembled and carried on the bed of the truck as are the endgates and skids.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A two wheel trailer including a wheel supported frame, and means to support an automobile above the frame, said means comprising a pair of longitudinally extending transversely spaced rails adapted to engage and support the axles of the automobile; the rails being disposed in a plane above the plane of the top of the trailer wheels a distance greater than the distance between the bottom of the axles and the bottom of the wheels of the supported automobile.

2. A two wheel trailer including a frame, wheels tiltably supporting the frame intermediate its ends, and a pair of longitudinally extending transversely spaced rails mounted above the frame and adapted to engage the axles of an automobile supported thereon and disposed at a height above the frame sufficient to enable the wheels of the supported automobile to clear the wheels of the trailer with movement of the automobile onto the trailer and when the tread spacing of the automobile and trailer wheels is substantially the same, said rails extending a substantial distance rearwardly beyond the plane of the rear end of the frame whereby when the frame is tilted rearwardly to a ground engaging position, the rear ends of the rails will approach the ground.

3. A two wheel trailer including a frame supported bed, a forwardly projecting tongue mounted on the frame, rigid sides mounted on and upstanding from the side edges of the bed, and longitudinally disposed rails mounted on the upper edges of the sides and extending the full length thereof, said rails being adapted to engage the axles of an automobile supported thereon; the rails being disposed in a plane above the plane of the top of the trailer wheels a distance greater than the distance between the bottom of the axles and the bottom of the wheels of the supported automobile.

4. A two wheel trailer including a frame supported bed, a forwardly projecting tongue mounted on the frame, rigid sides mounted on and upstanding from the side edges of the bed, and longitudinally disposed rails mounted on the upper edges of the sides and extending the full length thereof; said rails being adapted to engage the axles of an automobile supported thereon, and the sides being of a greater height than the radius of the wheels of an automobile disposed on the rails whereby to provide a working space between the under portion of the supported automobile and the trailer bed.

5. A wheeled trailer including a frame supported bed, a forwardly projecting tongue mounted on the frame, rigid sides mounted on and upstanding from the side edges of the bed, longitudinally disposed rails mounted on the upper edges of the sides and adapted to engage the axles of an automobile supported thereon, endgates removably mounted between the ends of the sides, and a cable winch mounted on the tongue with its axis extending transversely thereof, the cable from the winch drum being adapted upon removal of the front endgate to extend between the sides and between the rails lengthwise thereof.

6. A two wheel trailer including a wheel supported frame, means to support an automobile above the frame, said means comprising a pair of longitudinally extending, transversely spaced rails adapted to engage and support the axles of the automobile, a cable winch mounted on the frame, the cable from the winch being adapted to extend lengthwise of the trailer between the rails, the winch including a releasable pawl and ratchet mechanism normally acting to prevent unwinding of the cable, and a manually operable brake mechanism to control unwinding of the cable when the pawl and ratchet mechanism is released.

7. A device as in claim 5 including a derrick unit arranged for removable connection with the sides and bed of the trailer at the end thereof opposite the winch, said unit including a sheave through which the cable from the winch is adapted to be threaded.

8. A wheeled trailer including a frame supported bed, rigid sides mounted on and upstanding from the bed at the sides thereof, rails mounted on and extending along the upper edges of the rails for the full length thereof and adapted to engage and support the axles of an automobile, and endgates removably mounted between the ends of the sides.

9. A two wheel trailer including a frame supported bed tiltably mounted on the wheels, rigid sides mounted on and upstanding from the bed, rails mounted on and extending along the upper edges of the rails for the full length thereof and adapted to engage and support the axles of an automobile; the sides being beveled at the ends and the upper edges thereof being longer than the lower edges.

10. A two wheel trailer including a frame supported bed tiltably mounted on the wheels, rigid extending lengthwise of the bed at the sides of and above the same and adapted to engage and support the axles of an automobile, and means rigidly mounting the rails in connection with the bed at a predetermined height above the same; the rails at one end projecting a predetermined distance beyond the vertical plane of the corresponding end of the bed.

11. A two wheel trailer comprising a frame, a pair of wheels supporting the frame substantially central of its ends for tilting movement in a vertical plane, a tongue rigid with and projecting forwardly from the frame for detachable connection with a draft vehicle to then maintain the frame substantially horizontal, and rails to support the axles of an automobile, mounted on and rigid with the frame.

12. A structure as in claim 11, with a winch including a cable to pull the automobile onto the rails when tilted, mounted on the rigid tongue.

ALBERT L. STAHL.